(12) United States Patent
Taniguchi

(10) Patent No.: US 10,676,028 B2
(45) Date of Patent: Jun. 9, 2020

(54) ELECTRONIC MIRROR SYSTEM

(71) Applicant: ALPINE ELECTRONICS, INC., Tokyo (JP)

(72) Inventor: Keita Taniguchi, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 16/568,661

(22) Filed: Sep. 12, 2019

(65) Prior Publication Data

US 2020/0094740 A1     Mar. 26, 2020

(30) Foreign Application Priority Data

Sep. 25, 2018   (JP) ................................ 2018-178485

(51) Int. Cl.

| | |
|---|---|
| *H04N 7/18* | (2006.01) |
| *B60R 1/00* | (2006.01) |
| *B60R 1/12* | (2006.01) |
| *H04N 5/262* | (2006.01) |
| *H04N 5/445* | (2011.01) |
| *H04N 5/57* | (2006.01) |
| *B60R 11/04* | (2006.01) |

(52) U.S. Cl.
CPC .................. *B60R 1/00* (2013.01); *B60R 1/12* (2013.01); *H04N 5/2628* (2013.01); *H04N 5/445* (2013.01); *H04N 5/57* (2013.01); *B60R 11/04* (2013.01); *B60R 2001/1215* (2013.01); *B60R 2300/8066* (2013.01)

(58) Field of Classification Search
CPC ........ H04N 7/18; H04N 7/183; H04N 5/2628; H04N 5/445; H04N 5/57; B60R 11/04; B60R 1/00; B60R 1/12; B60R 2001/1215; B60R 1/02; B60R 2300/20; B60R 2300/207; B60R 2300/305; B60R 2300/8066
USPC ........ 348/148, 149, 143, 151, 113; 340/438, 340/425.5, 932.2, 995.17, 937, 933; 382/104; 359/838, 842–844; 362/494
See application file for complete search history.

(56) References Cited

U.S. PATENT DOCUMENTS

2015/0375680 A1\* 12/2015 Watanabe ................. B60R 1/00
                                                                    701/36

FOREIGN PATENT DOCUMENTS

| EP | 3 184 364 A1 | 6/2017 |
|---|---|---|
| JP | 2014-93768 A | 5/2014 |
| JP | 2016-22934 A | 2/2016 |

(Continued)

OTHER PUBLICATIONS

Extended European Search Report for European Patent Application No. 19198617.3 dated Nov. 12, 2019; 7 pages.

*Primary Examiner* — Sherrie Hsia
(74) *Attorney, Agent, or Firm* — Brinks Gilson & Lione

(57) ABSTRACT

An inclination angle of a display unit having a display is detected, the inclination angle being around an axis of the display unit in the fore-aft direction of a vehicle. The left and right of an image representing a scene behind the vehicle, the image being obtained by photography with a camera, is reversed. The reversed image is inclined through an angle that has the same absolute value as the detected inclination angle in a direction opposite to the direction of the inclination of the inclination angle. A display image range is set on the inclined image. An image in the display image range is extracted and displayed on the display.

16 Claims, 10 Drawing Sheets

(56) References Cited

FOREIGN PATENT DOCUMENTS

JP 2016-167859 A 9/2016

* cited by examiner

FIG. 2A1
FIG. 2A2
FIG. 2A3
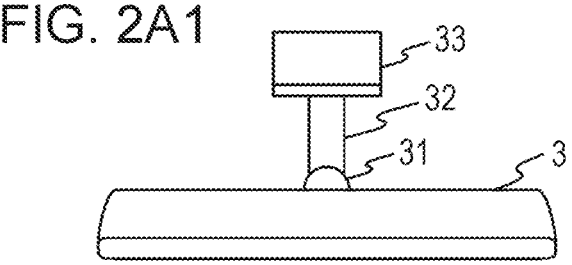
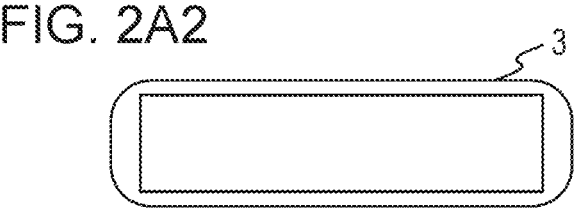
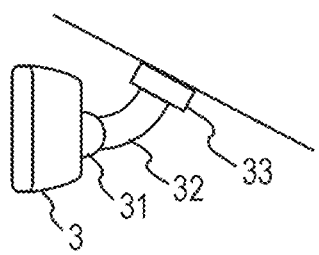
FIG. 2B1
FIG. 2B2
FIG. 2B3
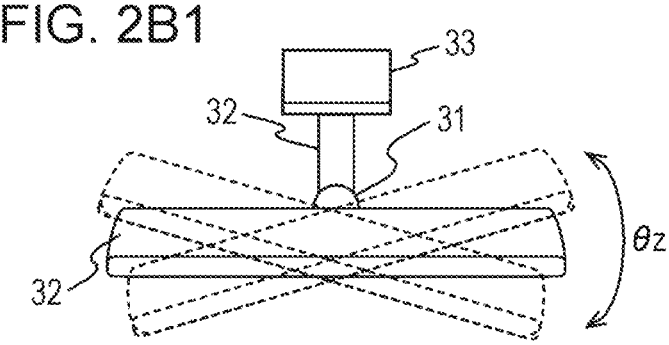
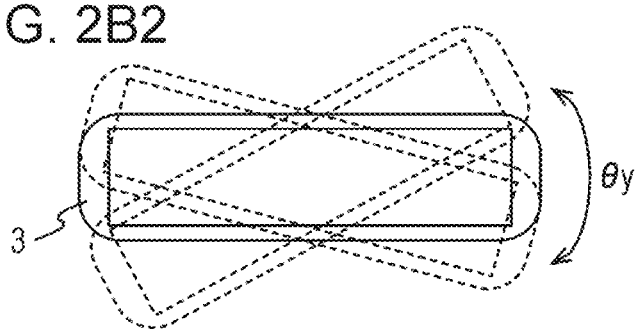
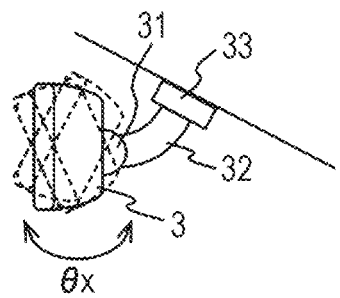
FIG. 2C
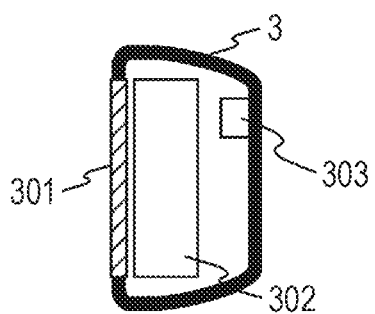

FIG. 4A
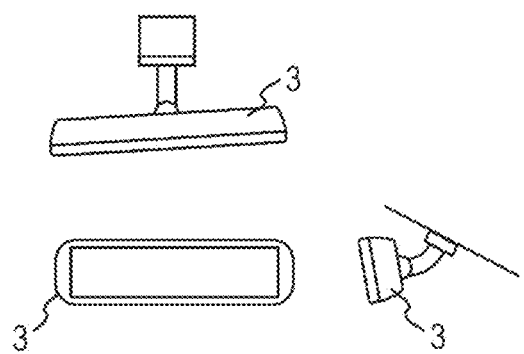
FIG. 4B
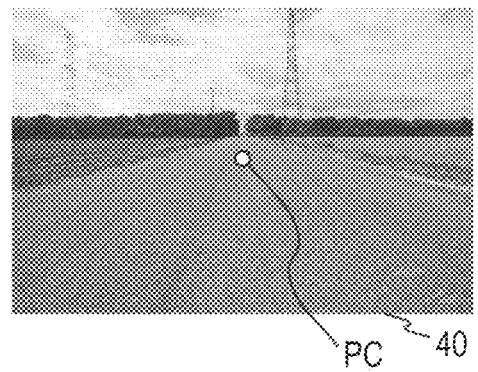
FIG. 4C1
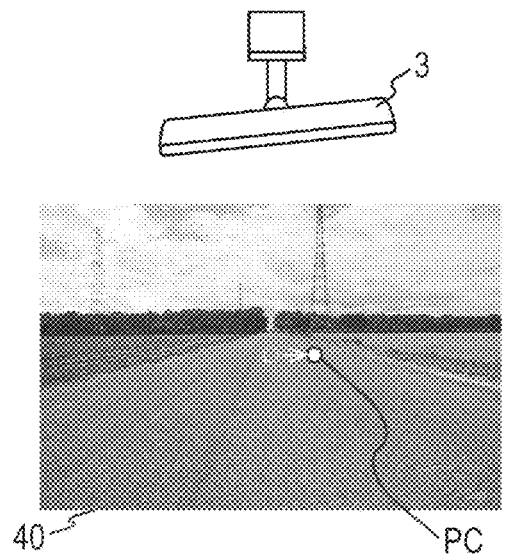
FIG. 4C2
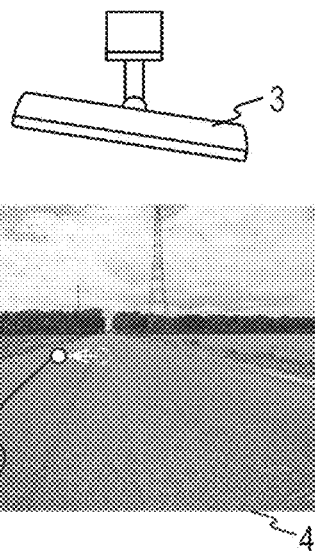
FIG. 4D1
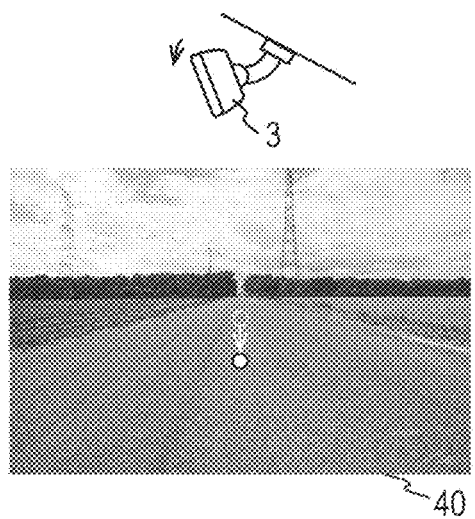
FIG. 4D2
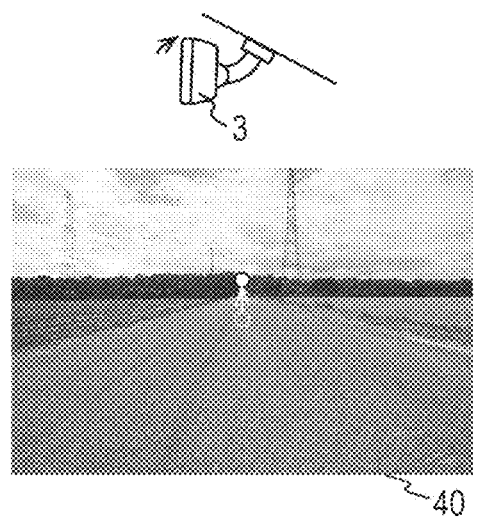

FIG. 5A
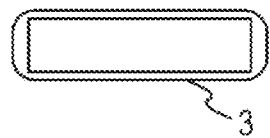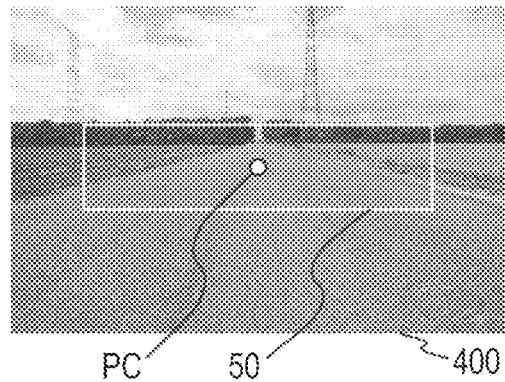
FIG. 5B
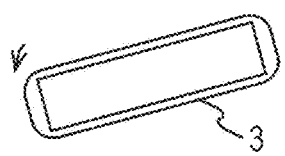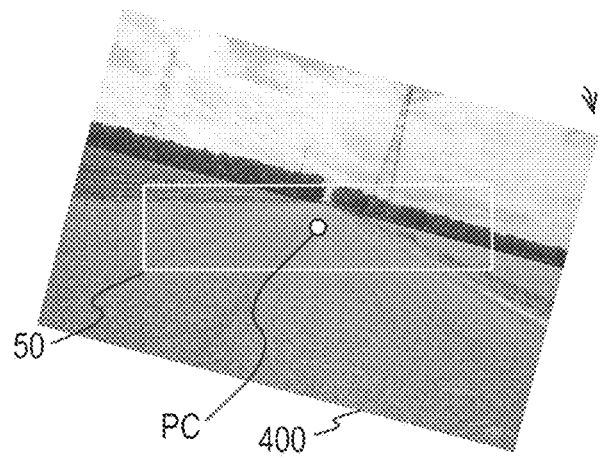
FIG. 5C
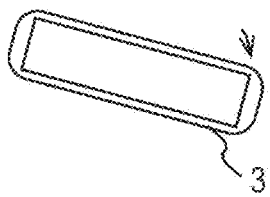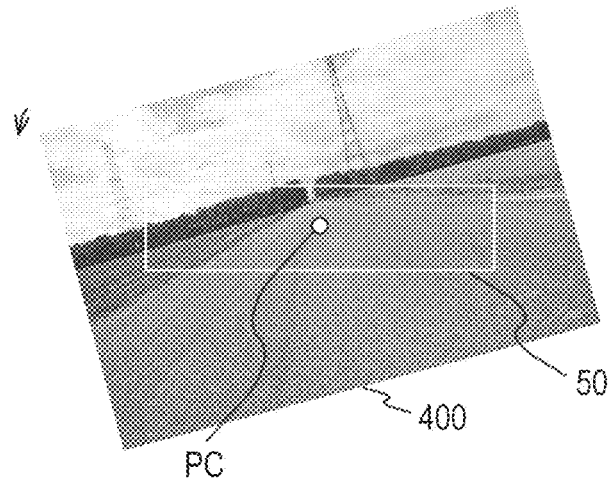

FIG. 9A1
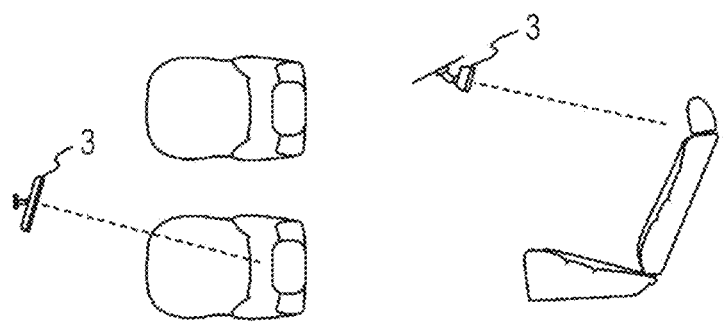
FIG. 9A2
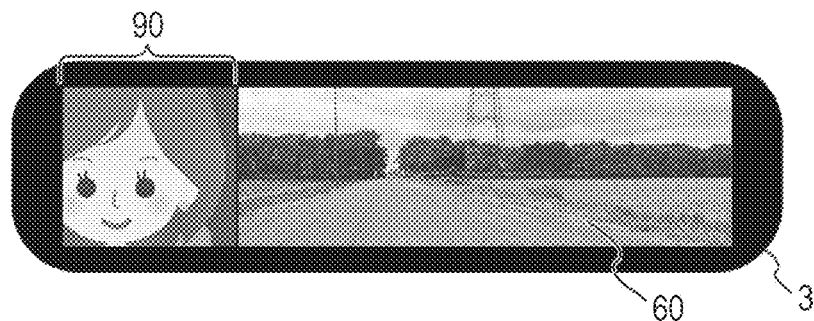
FIG. 9B1
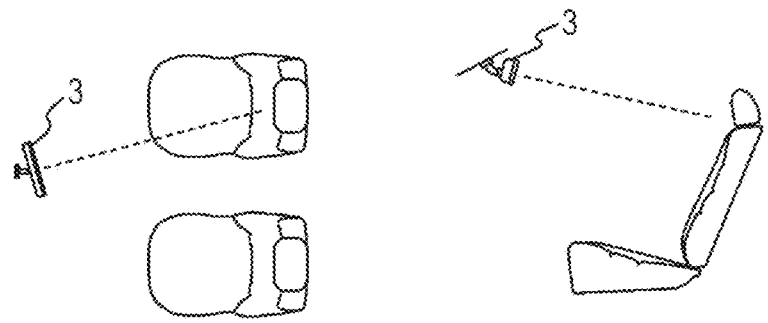
FIG. 9B2
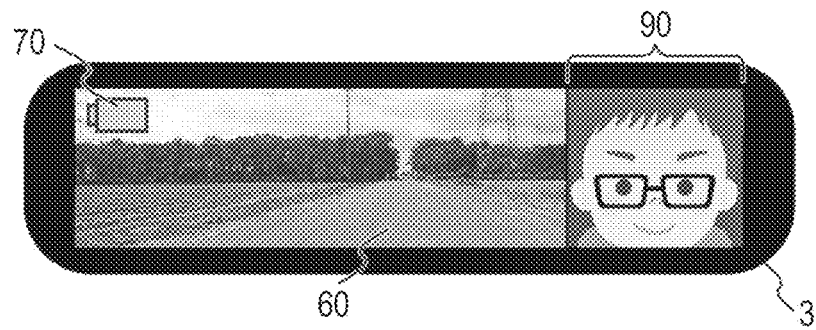

ELECTRONIC MIRROR SYSTEM

RELATED APPLICATION

The present application claims priority to Japanese Patent Application Number 2018-178485, filed Sep. 25, 2018, the entirety of which is hereby incorporated by reference.

BACKGROUND

1. Field

The present disclosure relates to an image display technology in an electronic mirror system.

2. Description of the Related Art

In an electronic mirror system, a display unit having a display is disposed at an upper position on a front window shield so that the orientation of the display unit can be changed, instead of a rear-view mirror. Part of an image obtained by photography with a camera that takes a picture of a scene behind a vehicle is displayed on the display of the display unit. In an image display technology known in this type of electronic mirror system, a portion to be extracted from an image obtained by photography with the camera and then to be displayed on the display is changed according to the display unit orientation changed by the user by manipulating the display unit (see Japanese Unexamined Patent Application Publication No. 2016-167859, for example).

In another image display technology known in an electronic mirror system, a display unit having a display and a half mirror disposed in front of the display is disposed at an upper position on a front window shield instead of a rear-view mirror. The display unit is selectively used as a mirror that reflects a state at the back of the vehicle and as a display that displays an image obtained by photography with a camera that takes a picture of a scene behind the vehicle (see Japanese Unexamined Patent Application Publication No. 2016-22934, for example).

In the electronic mirror system in which a display unit having a display is disposed at an upper position on a front window shield so that the orientation of the display unit can be changed, the user may significantly incline the right-left direction of the display unit from the horizontal direction of the vehicle for the usability by the user or the user's preference.

If the display unit is used like this, the horizontal direction in an image displayed on the display is significantly inclined from the horizontal direction of the vehicle. As a result, an unnatural image is displayed on the display in which the horizontal direction of scenery in the image is significantly inclined from the horizontal direction of the actual space. This makes it hard for the user to grasp a backward scene.

When a rear-view mirror based on a conventional mirror is used, however, even if the left-right direction of the rear-view mirror is significantly inclined from the horizontal direction, scenery reflected on the rear-view mirror is not inclined.

In an electronic mirror system in which a display unit having a display is provided so that the orientation of the display unit can be changed, the present disclosure addresses the above problem with the objective of minimizing the user from having difficulty in grasping a backward scene from an image displayed on the display, even if the display unit is used in a state in which it is significantly inclined.

SUMMARY

To achieve the above objective, an electronic mirror system in the present disclosure that displays an image representing a scene behind a vehicle, the image being obtained by photography with a camera, is equipped with: a display on which coordinates on a display screen are defined by a horizontal coordinate axis and a vertical coordinate axis; an inclination angle detecting unit; and a display control unit that displays, on the display, an image obtained by photography with the camera. The display is attached to the vehicle so that the inclination angle of the horizontal coordinate axis with respect to the horizontal direction of the vehicle can be changed. The inclination angle detecting unit detects the inclination angle of the horizontal coordinate axis with respect to the horizontal direction of the vehicle. The display control unit displays a display image on the display, the display image being created by editing the image obtained by photography with the camera according to the inclination angle detected by the inclination angle detecting unit so that a direction in a scene, in the actual space, represented by an image displayed on the display, the direction corresponding to the horizontal direction in the actual space, matches the horizontal direction in the actual space.

More specifically, in this type of electronic mirror system, the display may be disposed at an upper position on the front window shield in the vehicle with a display surface oriented toward the back of the vehicle, and as the display image, the display control unit may display, on the display, an image created by reversing the left and right of the image obtained by photography with the camera, and then inclining the reversed image through an angle that has the same absolute value as the inclination angle detected by the inclination angle detecting unit, in a direction opposite to the direction of the inclination of the inclination angle.

In the electronic mirror system described above, the display control unit may i) incline a predetermined display object through an angle that has the same absolute value as the inclination angle detected by the inclination angle detecting unit, in a direction opposite to the direction of the inclination of the inclination angle, ii) combine the inclined predetermined display object with the display image, and iii) display the combined image on the display.

In this case, the display object may be an icon or an image that represents a state at the back of the vehicle when viewed from the front of the vehicle.

In the electronic mirror system described above, even if the user uses the display unit so that the left-right direction of the display is significantly inclined from the horizontal direction of the vehicle, it is possible to have the horizontal direction of scenery in a display image displayed on the display match the actual horizontal direction.

The electronic mirror system described above may have an electronic mirror mode and a mirror mode and may also have a display unit that includes the display and a half mirror disposed in front of the display surface of the display. When the electronic mirror mode is in progress, the display control unit may display the display image on the display. When the mirror mode is in progress, the display control unit may perform control to lower the brightness of the display surface of the display so that the half mirror functions as a mirror.

The electronic mirror system described above may have a display unit that includes the display and a half mirror disposed in front of the display surface of the display and may also have an inclination sensor that measures the inclination angles of the display unit around its three mutually orthogonal axes. The inclination angle detecting unit may detect the inclination angle of the horizontal coordinate axis with respect to the horizontal direction of the vehicle, measured by the inclination sensor, of the display unit. When the inclination angles measured by the inclination sensor indicate that the display surface of the display of the display unit is oriented to the head of a passenger in the vehicle, the display control unit may perform control to lower the brightness of the whole or part of the display surface of the display so that the whole or part of the half mirror functions as a mirror.

As an electronic mirror system that displays an image representing a scene behind a vehicle, the image being obtained by photography with a camera, the present disclosure also provides an electronic mirror system that includes: a display unit that includes a display and a half mirror disposed in front of the display surface of the display; an inclination sensor; and a display control unit that displays, on the display, an image obtained by photography with the camera. The display unit is attached to the vehicle so that the inclination angle of the display unit can be changed. The inclination sensor measures the inclination angles of the display unit around its three mutually orthogonal axes. When the inclination angles measured by the inclination sensor indicate that the display surface of the display of the display unit is oriented to the head of a passenger in the vehicle, the display control unit may perform control to lower the brightness of the whole or part of the display surface of the display so that the whole or part of the half mirror functions as a mirror.

In the electronic mirror system described above, when the inclination angles measured by the inclination sensor indicate that the display surface of the display of the display unit is oriented to the head of the driver in the driver's seat in the vehicle, the display control unit may perform control to lower the brightness of part of the display surface of the display on the driver's seat side so that part of the half mirror on the driver's seat side functions as a mirror; when the inclination angles measured by the inclination sensor indicate that the display surface of the display of the display unit is oriented to the head of the passenger on the passenger seat in the vehicle, the display control unit may perform control to lower the brightness of part of the display surface of the display on the passenger seat side so that part of the half mirror on the passenger seat side functions as a mirror.

With the electronic mirror system of this type, the user can use a display unit that displays an image representing a scene behind the vehicle, the image being obtained by photography with a camera, as a mirror just by orienting the display unit toward the face of the user, enabling the user to confirm the state of the user.

As described above, in the electronic mirror system according to the present disclosure, in which a display unit having a display is provided so that the orientation of the display unit can be changed, even if the display unit is used in a state in which it is significantly inclined, it is possible to minimize the user from having difficulty in grasping a backward scene from an image displayed on the display.

BRIEF DESCRIPTION OF THE DRAWINGS

FIG. 1A is a block diagram of the structure of an electronic mirror system according to an embodiment of the present disclosure, while

FIGS. 2A1 to 2C illustrate the structure of a display unit;

FIGS. 4A to 4D2 illustrate operations of display control processing according to an embodiment of the present disclosure;

FIGS. 5A to 5C also illustrate operations of display control processing according to an embodiment of the present disclosure;

FIGS. 9A1 to 9B2 also illustrate display examples on the display according to an embodiment of the present disclosure.

DESCRIPTION OF THE PREFERRED EMBODIMENTS

An embodiment of the present disclosure will be described below.

Figure 1A:
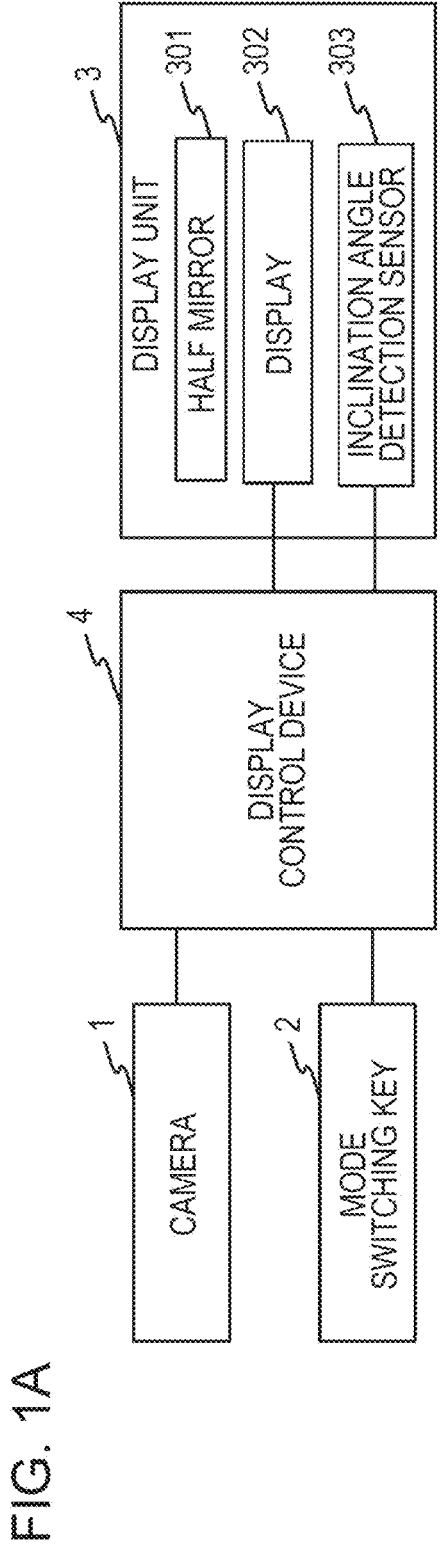

FIG. 1A illustrates the structure of an electronic mirror system according to this embodiment.

The electronic mirror system, which is mounted in a vehicle, has a camera 1, a mode switching key 2, a display unit 3, and a display control device 4 as illustrated in the drawing.

The display unit 3 has a half mirror 301, a display 302, and an inclination angle detection sensor 303.

Figure 1B:
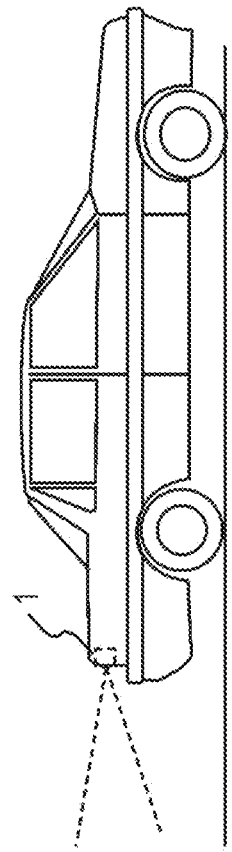
FIG. 1B illustrates a camera disposed on the back of a vehicle to take a picture of a scene behind the vehicle.
Figure 1C:
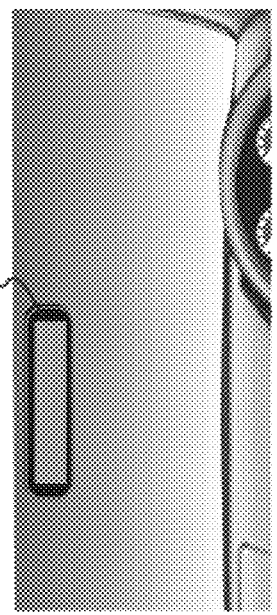
FIG. 1C illustrates a display unit disposed at an upper position on the front window shield of the vehicle.

The camera 1 is disposed, for example, on the back of a vehicle to take a picture of a scene behind the vehicle, as illustrated in FIG. 1B. The display unit 3 is disposed at an upper position on the front window shield of the vehicle, that is, at a position at which a rear-view mirror has been conventionally disposed, with the display surface oriented toward the back, as illustrated in FIG. 1C.

Figure 3:
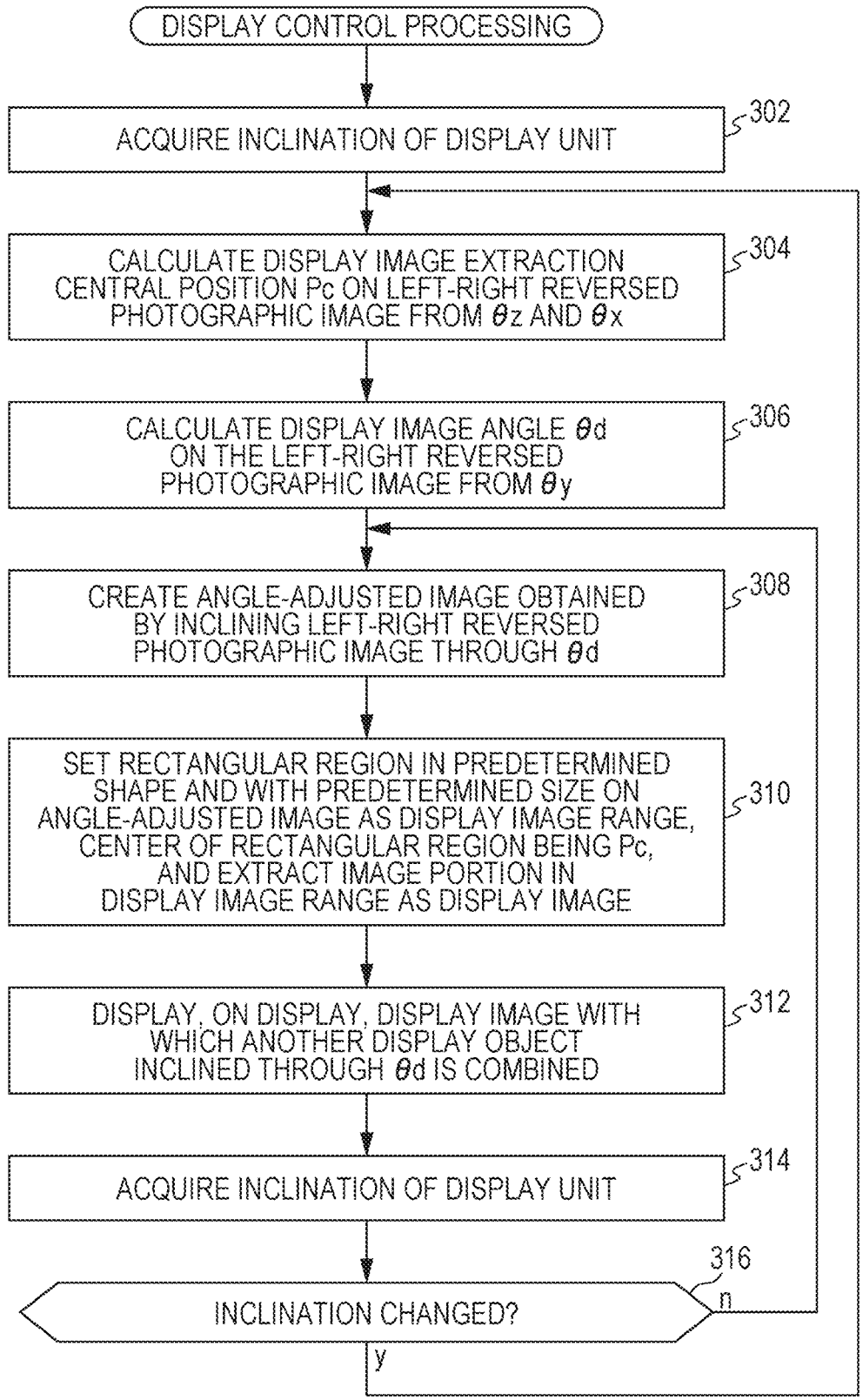
FIG. 3 is a flowchart indicating display control processing according to an embodiment of the present disclosure.

FIG. 2A1 to 2A3 illustrate the structure of the display unit 3.

FIG. 2A1 illustrates the upper surface of the display unit 3. FIG. 2A2 illustrates the front surface of the display unit 3. FIG. 2A3 illustrates the right side surface of the display unit 3. The direction toward the back of the vehicle is the direction in which the front surface of the display unit 3 is oriented.

As illustrated in these drawings, the display unit 3 is supported by the front window shield of the vehicle through a pivot 31, an arm 32, and a base 33.

The pivot 31 is linked to the display unit 3 and to the front end of the arm 32. The rear end of the arm 32 is linked to the base 33 fixed to the front window shield of the vehicle.

The pivot 31 is a swinging shaft that pivotably supports the display unit 3 to the arm 32 so that the display unit 3 can swing around its three axes. The user can arbitrarily set an inclination angle θz, illustrated in FIG. 2B1, of the display unit 3 around its axis in the up-down direction of the vehicle, an inclination angle θy, illustrated in FIG. 2B2, of the display unit 3 around its axis in the fore-aft direction of the vehicle, and an inclination angle θx, illustrated in FIG. 2B3, of the display unit 3 around its axis in the left-right direction of the vehicle within a predetermined range.

The half mirror 301, display 302, and inclination angle detection sensor 303 described above are included in the display unit 3 as schematically illustrated by the cross-section in FIG. 2C that is taken when the display unit 3 is viewed in the left-right direction.

The display 302, which is a transmission type of display device having a backlight or a spontaneous light emitting type of display device, emits image light from the display surface. The display 302 is disposed with its display surface oriented toward the front surface of the display unit 3. The half mirror 301 is disposed so that it covers the display surface of the display 302 and that a surface of the half mirror 301, the surface being opposite to the display 302, is optically exposed forward.

Coordinates (specifically, pixel coordinates) on the display surface of the display 302 are defined by a horizontal coordinate axis (X axis) and a vertical coordinate axis (Y axis). The left-right direction in FIGS. 2A1 and 2A2 is the direction of the horizontal coordinate axis (X axis), and the up-down direction in FIGS. 2A2 and 2A3 is the direction of the vertical coordinate axis (Y axis).

In this structure, when an image is displayed on the display 302, the displayed image passes through the half mirror 301 and becomes visible to the user. When the entire display surface of the display 302 is completely darkened, the half mirror 301 functions as a mirror that uses the front surface of the display unit 3 as a reflecting surface. When only part of the display surface of the display 302 is completely darkened, only a region, on the half mirror 301, that overlaps the darkened region functions as a mirror, in which case an image displayed on a non-dark region on the display surface of the display 302 passes through the half mirror 301 and becomes visible to the user.

If the display 302 is a transmission type of display device having a backlight, the entire display surface of the display 302 can be completely darkened by turning off the backlight or producing a black display on the entire display surface. If the display 302 is a spontaneous light emitting type of display device, the entire display surface of the display 302 can be completely darkened by turning off the display on the display 302 or producing a black display on the entire display surface.

When a black display is produced on part of the display surface of the display 302, the region, on the display surface, on which the black display is produced can be completely darkened regardless of whether the display 302 is a transmission type of display device or a spontaneous light emitting type of display device.

The inclination angle detection sensor 303 detects the inclination angles θz, θy, and θx, described above, of the display unit 3 around its three axes. The inclination angle θy of the display unit 3 around its axis in the fore-aft direction of the vehicle is measured assuming that the angle of the display unit 3 in the fore-aft direction of the vehicle is 0 degree when the horizontal coordinate axis (X axis) matches the horizontal direction, that is, the horizontal coordinate axis (X axis) of the display 302 is horizontal in the real space when the vehicle is on level ground.

Processing performed by the display control device 4 in the structured described above will be described below.

First, when the user sets a mirror mode with the mode switching key 2, the display control device 4 completely darkens the entire display surface of the display 302 so that the display unit 3 functions as a mirror that uses the front surface as a reflecting surface.

When the user sets an electric mirror mode with the mode switching key 2, the display control device 4 executes display control processing illustrated in FIG. 3.

As illustrated in the drawing, the display control device 4 begins display control processing by acquiring the inclination angles θz, θy, and θx of the display unit 3 around its three axes, the inclination angles having been detected by the inclination angle detection sensor 303 (step 302).

The display control device 4 then calculates a display image extraction center position Pc on a left-right reversed photographic image 40, which is obtained by reversing the left and right of an image obtained by photography with the camera 1, from the inclination angle θz of the display unit 3 around its axis in the up-down direction of the vehicle and the inclination angle θx of the display unit 3 around its axis in the left-right direction of the vehicle (step 304).

The display image extraction center position Pc is calculated as described below.

Standard values for the inclination angles θz, θy, and θx of the display unit 3 are set in advance in, for example, the orientation of the display unit 3 as illustrated in FIG. 4A. A standard value for the display image extraction center position Pc in the left-right reversed photographic image 40 is also set in advance as illustrated in FIG. 4B.

The standard values for the inclination angles θz, θy, and θx of the display unit 3 are inclination angles that are considered to be typically set by the user for the display unit 3. However, the standard value for the inclination angle θy of the display unit 3 around its axis in the fore-aft direction of the vehicle is 0 degree, that is, an inclination angle at which the horizontal coordinate axis (X axis) of the display 302 is horizontal when the vehicle is on level ground.

The standard value for the display image extraction center position Pc is coordinates in the left-right reversed photographic image 40 obtained, when the display unit 3 is in the mirror mode and functions as a mirror, by photographing a position behind the vehicle, the position appearing at the center of the display unit 3 for which the inclination angles θz, θy, and θx are set to the standard values when viewed from the user at the driver's seat.

In step 304, the display control device 4 calculates, as the display image extraction center position Pc, coordinate values on the left-right reversed photographic image 40 so that the larger the extent, represented by the inclination angle θz of the display unit 3 obtained in step 302, to which the display unit 3 is oriented toward the right is, the more the inclination angle θz is separated toward the right from the standard value for the display image extraction center position Pc, and also calculates, as the display image extraction center position Pc, coordinate values on the left-right reversed photographic image 40 so that the larger the extent to which the display unit 3 is oriented toward the left is, the more the inclination angle θz is separated toward the left from the standard value for the display image extraction center position Pc, as illustrated in FIGS. 4C1 and 4C2.

Similarly, the display control device 4 calculates, as the display image extraction center position Pc, coordinate values on the left-right reversed photographic image 40 so that the larger the extent, represented by the inclination angle θx of the display unit 3 obtained in step 302, to which the display unit 3 is oriented downward is, the more the inclination angle θx is separated toward the bottom from the standard value for the display image extraction center position Pc, and also calculates, as the display image extraction center position Pc, coordinate values on the left-right reversed photographic image 40 so that the larger the extent to which the display unit 3 is oriented upward is, the more the inclination angle θx is separated toward the top from the standard value for the display image extraction center position Pc, as illustrated in FIGS. 4D1 and 4D2.

Referring again to FIG. 3, after having calculated the display image extraction center position Pc (step 304), the display control device 4 calculates a display image angle θd on the left-right reversed photographic image 40 from the inclination angle θy of the display unit 3 around its axis in the fore-aft direction of the vehicle (step 306).

In step 306, an inclination angle −θy, that is, an angle that has the same absolute value as the inclination angle θy of the display unit 3 around its axis in the fore-aft direction of the vehicle but is inclined in a direction opposite to the direction of the inclination of the inclination angle θy, is calculated as the display image angle θd.

The display control device 4 creates an image obtained by rotating the left-right reversed photographic image 40 through the display image angle θd as an angle-adjusted image (step 308).

Next, the display control device 4 sets a rectangular region in a predetermined shape and with a predetermined size on the created angle-adjusted image as a display image range, the center of the rectangular region being the display image extraction center position Pc, the direction of the shorter sides of the rectangular region being the up-down direction of the angle-adjusted image, the direction of the longer sides of the rectangular region being the left-right direction of the angle-adjusted image, after which the display control device 4 extracts an image portion in the display image range from the angle-adjusted image as a display image (step 310). The display image extraction center position Pc on the angle-adjusted image is the position, on the angle-adjusted image, that corresponds to the display image extraction center position Pc on the left-right reversed photographic image 40.

The rectangular region set as the display image range is similar in shape to the display surface of the display 302 of the display unit 3. When the inclination angles θz, θy, and θx of the display unit 3 are the standard values, the rectangular region has the same size as, for example, a region, on the left-right reversed photographic image 40, in which, when the display unit 3 functions as a mirror in the mirror mode, a backward range reflected in the display unit 3 is displayed.

FIGS. 5A, 5B, and 5C illustrate a relationship among the inclination angle θy of the display unit 3 around its axis in the fore-aft direction of the vehicle, an angle-adjusted image 400 obtained by rotating the left-right reversed photographic image 40 through the display image angle θd as described above, and a display image range 50 set in the angle-adjusted image 400. As illustrated in these drawings, the display image, which is the image in the display image range 50, is an image the up-down direction (direction of the shorter edges) of which is the up-down direction of the angle-adjusted image 400 obtained by inclining the left-right reversed photographic image 40 in a direction opposite to the direction of the inclination of the display unit 3 around its axis in the fore-aft direction of the vehicle and the left-right direction of which is the left-right direction of the angle-adjusted image 400.

Referring again to FIG. 3, after having extracted the display image (step 310), the display control device 4 combines another display object such as an icon with the display image in such a way that the other display object is inclined through the display image angle θd and displays the display image with which the other display object has been combined on the display 302 of the display unit 3 (step 312). When the display image is to be displayed, the left-right direction (direction of the longer sides) is set to the horizontal coordinate direction of the display 302 and the up-right down direction (direction of the shorter sides) is set to the vertical coordinate direction of the display 302 so that the display image is displayed on the entire display surface of the display 302.

Next, the display control device 4 acquires the inclination angles θz, θy, and θx, detected by the inclination angle detection sensor 303, of the display unit 3 around its three axes (step 314), and checks whether the inclination angles θz, θy, and θx have changed (step 316). If they have not changed, the display control device 4 returns to processing starting from step 308. If these inclination angles have changed, the display control device 4 returns to processing starting from step 304.

This completes the description of display control processing performed by the display control device 4 while the electronic mirror mode is in progress.

Processing in steps 308 and 310 in display control processing described above is equivalent to setting, as the display image range 50, a rectangular region in a predetermined shape and with a predetermined size on the left-right reversed photographic image 40, the rectangular region being inclined through the inclination angle θy, the center of the rectangular region being the display image extraction center position Pc, extracting an image in the display image range 50 from the left-right reversed photographic image 40, and inclining the extracted image through the display image angle θd to use the inclined image as a display image.

In display control processing described above, a display image displayed on the display 302 is part of the angle-adjusted image 400 obtained by rotating the left-right reversed photographic image 40 through an angle that has the same absolute value as the inclination angle θy of the display unit 3 around its axis in the fore-aft direction of the vehicle but is inclined in a direction opposite to the direction of the inclination of the inclination angle θy, the up-down direction of the angle-adjusted image 400 being taken as the horizontal coordinate axis (X axis), the up-down direction of the angle-adjusted image 400 being taken as the vertical coordinate axis (Y axis). Therefore, as illustrated in FIGS. 6A, 6B, and 6C, even if the user uses the display unit 3 so that the left-right direction of the display 302 is significantly inclined from the horizontal direction, it is possible to have the horizontal direction of scenery in a display image 60 displayed on the display 302 match the horizontal direction in the actual space.

Another display object 70 such as an icon is also displayed in such a way that the other display object 70 is inclined through the display image angle θd. Therefore, it is possible to have the up-down direction and left-right direction of the other display object 70 displayed on the display 302 match the vertical direction and horizontal direction in the actual space.

Figure 6A:
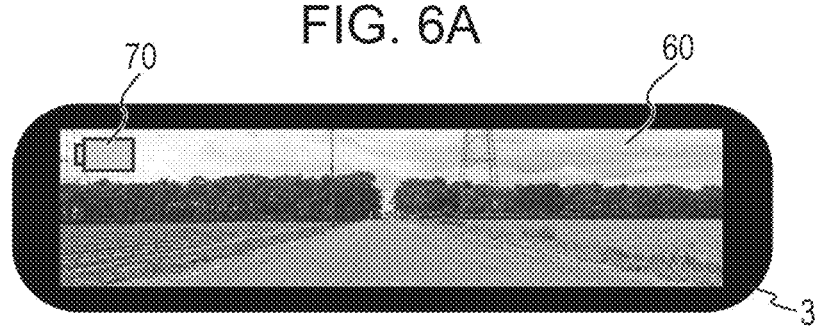
FIGS. 6A to 6C illustrate display examples on a display according to an embodiment of the present disclosure.
Figure 6B:
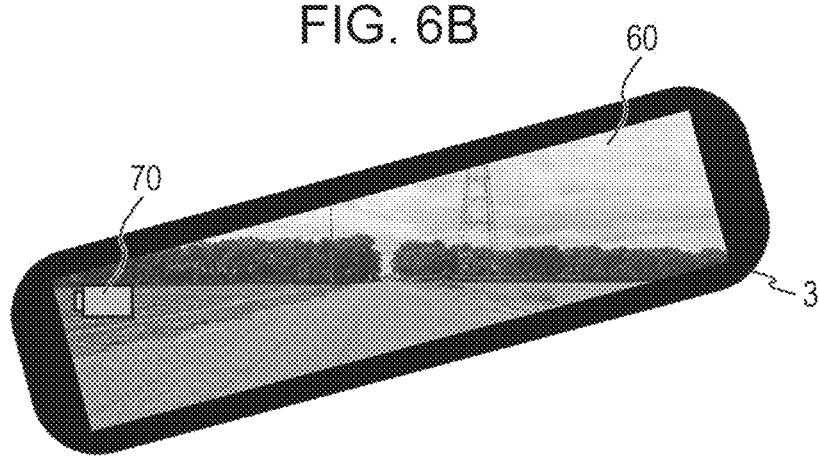
Figure 6C:
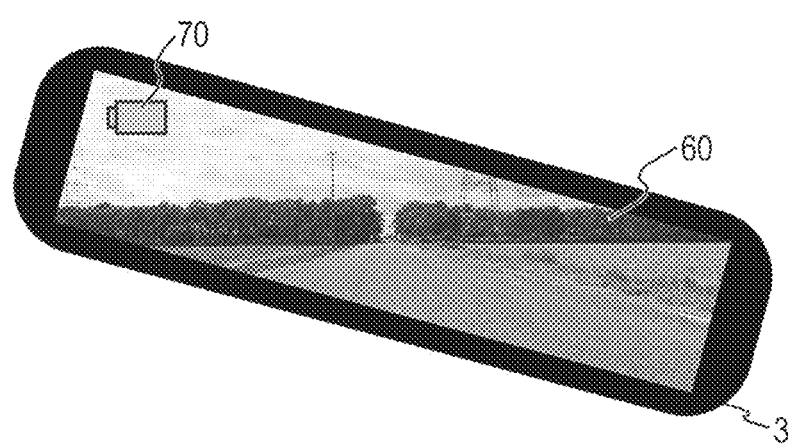

In FIGS. 6A, 6B, and 6C, an icon indicating that the electronic mirror mode is in progress is displayed as the other display object 70.

Figure 7A:
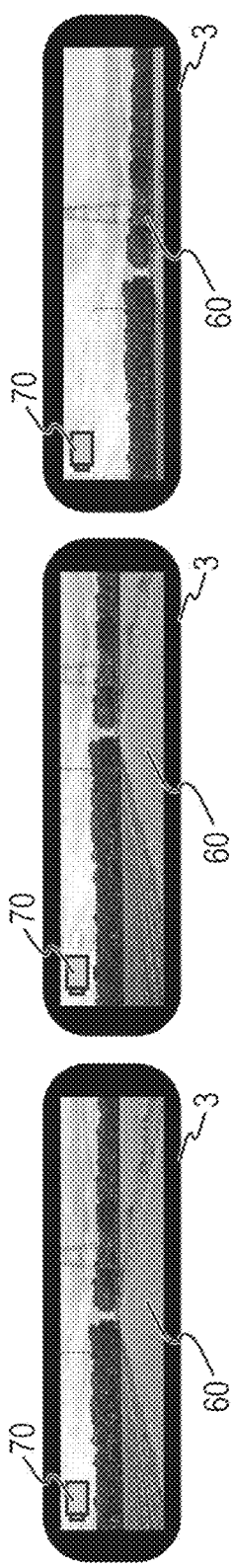
FIGS. 7A to 7C also illustrate display examples on the display according to an embodiment of the present disclosure.
Figure 7B:
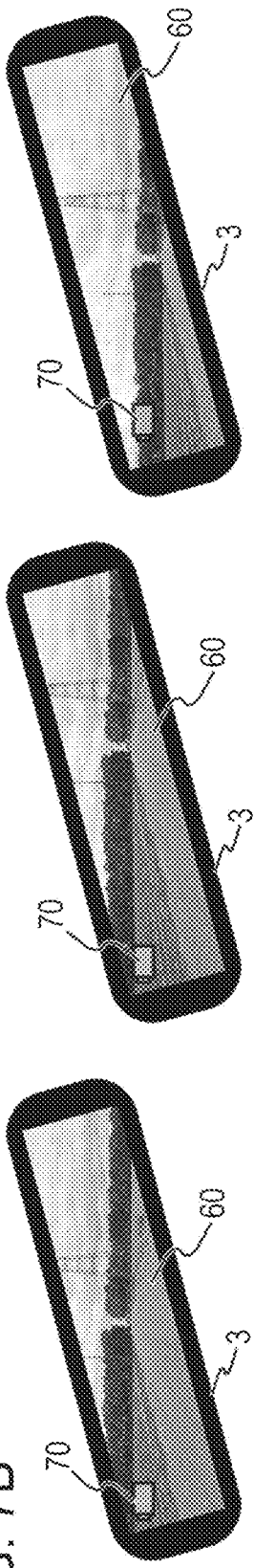
Figure 7C:
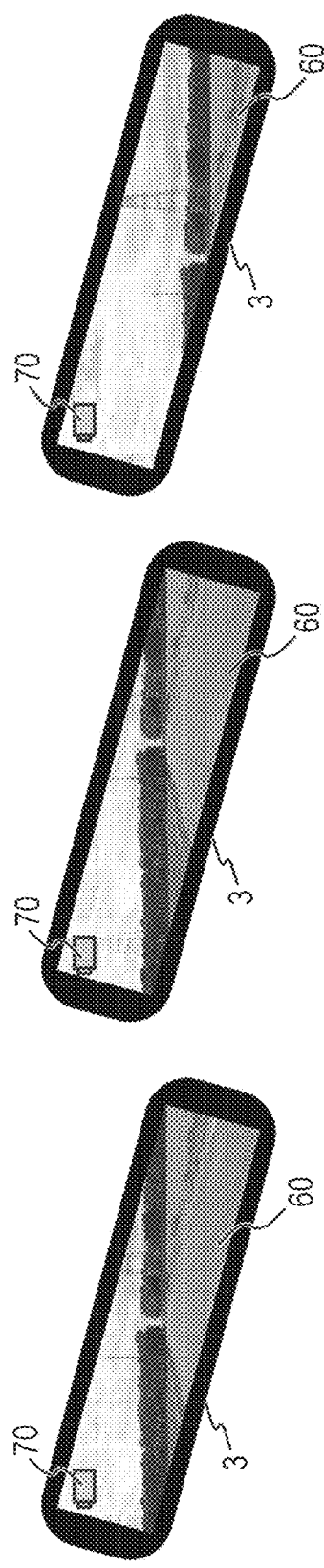

In display control processing described above, as illustrated in FIGS. 7A, 7B, and 7C, the display image range 50, which is a range, in the left-right reversed photographic image 40, from which the display image 60 is extracted, is moved according to the inclination angle θz of the display unit 3 around its axis in the up-down direction of the vehicle and to the inclination angle θx of the display unit 3 around its axis in the left-right direction of the vehicle. The user can change a backward range displayed on the display 302 can be changed by changing the inclination of the display unit 3 around its axis in the up-down direction of the vehicle or the inclination of the display unit 3 around its axis in the left-right direction of the vehicle, as is a rear-view mirror that uses a conventional mirror.

This completes the description of the embodiment of the present disclosure.

Figure 8A:
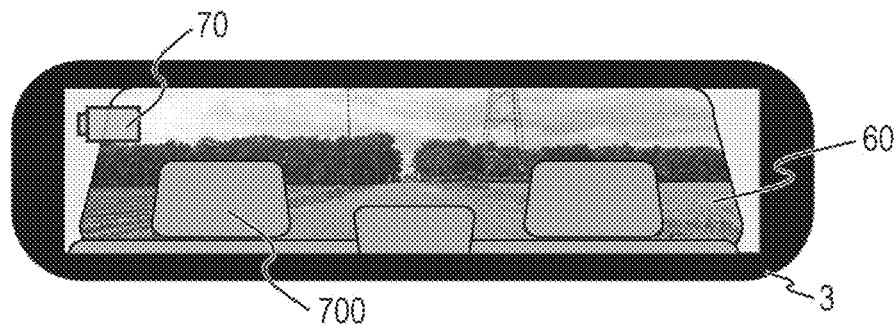
FIGS. 8A to 8C also illustrate display examples on the display according to an embodiment of the present disclosure.
Figure 8B:
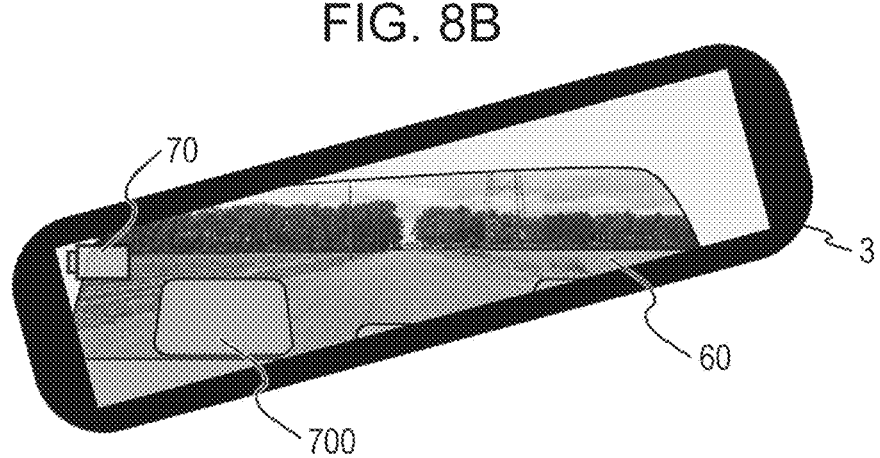
Figure 8C:
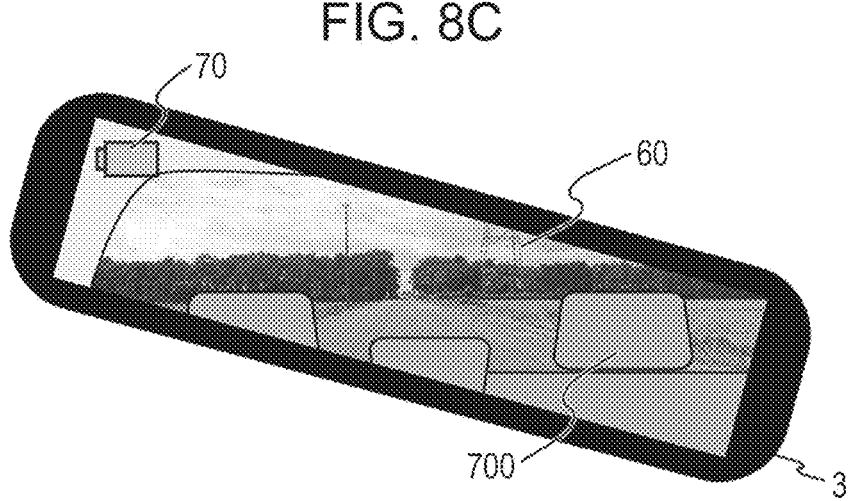

In the above embodiment, as the other display object 70 described above, a graphic prepared in advance that represents a state at the back of the vehicle when viewed from the front of the vehicle or an in-vehicle backward image 700 obtained by photographing the back of the vehicle with an in-vehicle camera, which is provided separately, from the front of the vehicle may be combined with the display image 60, and the combined image may be displayed, as illustrated in FIGS. 8A, 8B, and 8C. In this case as well, the in-vehicle backward image 700 is combined with the display image 60 in such a way that the in-vehicle backward image 700 is inclined through the display image angle θd before the combined image is displayed.

The inclination angles θz, θy, and θx, detected by the inclination angle detection sensor 303, of the display unit 3 around its three axes may indicate that the display surface of the display 302 of the display unit 3 is oriented toward a standard position of the head of the user sitting on the passenger seat as illustrated in FIG. 9A1. In the embodiment described above, in this case, the display control device 4 may completely darken a region that is part of the display 302 on the passenger seat side so that the user on the passenger seat can use an area 90, on the half mirror 301, that coincides with the region as a mirror to reflect the face of the user on the passenger seat, as illustrated in FIG. 9A2.

Similarly, the inclination angles θz, θy, and θx, detected by the inclination angle detection sensor 303, of the display unit 3 around its three axes may indicate that the display surface of the display 302 of the display unit 3 is oriented toward a standard position of the head of the user sitting on the driver's seat as illustrated in FIG. 9B1. In this case, the display control device 4 may completely darken a region that is part of the display 302 on the driver's seat side so that the user on the driver's seat can use the area 90, on the half mirror 301, that coincides with the region as a mirror to reflect the face of the user on the driver's seat, as illustrated in FIG. 9B2.

Thus, the user on the driver's seat or passenger seat can use the display unit 3 as a mirror to check the state of the user just by orienting the display unit 3 toward the face of the user.

Figure 10A:
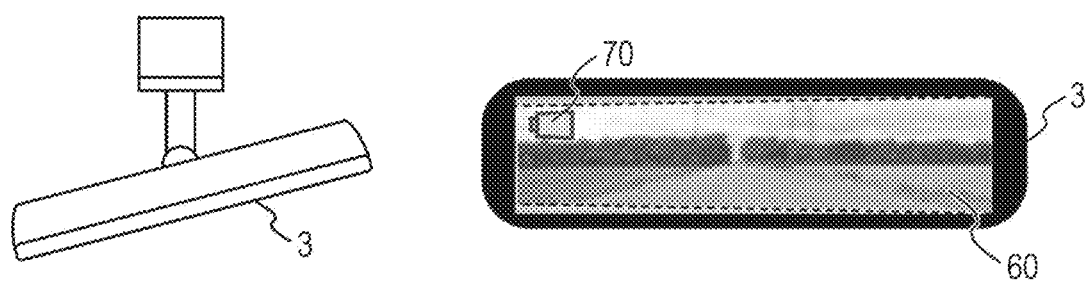
FIGS. 10A and 10B also illustrate display examples on the display according to an embodiment of the present disclosure.
Figure 10B:
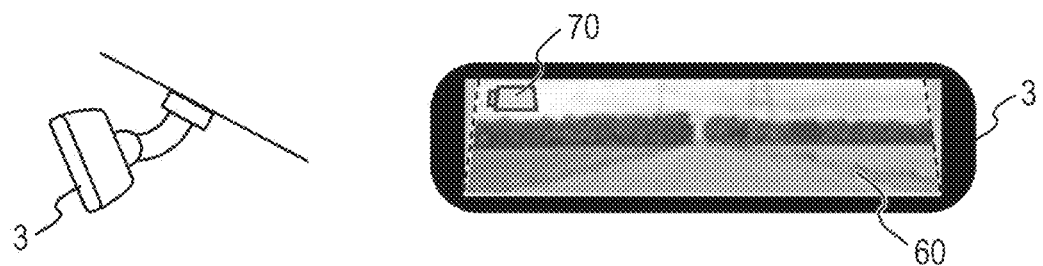

In the above embodiment, the display control device 4 may apply keystone correction to the display image 60 with which the display object 70 has been combined according to the inclination angles θz, θy, and θx of the display unit 3 so that a display on the display 302 becomes rectangular when viewed from the user as illustrated in FIGS. 10A and 10B before displaying the combined image. The display control device 4 may also change the brightness of the display 302 according to the inclination angles θz, θy, and θx of the display unit 3 so that the brightness of a display on the display 302 when viewed from the user of the display unit 3 regardless of the orientation of the display unit 3.

What is claimed is:

1. An electronic mirror system that displays an image representing a scene behind a vehicle, the image being obtained by photography with a camera, the system comprising:

a display on which coordinates on a display screen are defined by a horizontal coordinate axis and a vertical coordinate axis;

an inclination angle detecting unit; and a display control unit that displays, on the display, an image obtained by photography with the camera; wherein the display is attached to the vehicle so that an inclination angle of the horizontal coordinate axis with respect to a horizontal direction of the vehicle is changeable, the inclination angle detecting unit detects the inclination angle of the horizontal coordinate axis with respect to the horizontal direction of the vehicle, and the display control unit displays a display image on the display, the display image being created by editing the image obtained by photography with the camera according to the inclination angle detected by the inclination angle detecting unit so that a direction in a scene, in an actual space, represented by an image displayed on the display, the direction corresponding to a horizontal direction in the actual space, matches the horizontal direction in the actual space.

2. The electronic mirror system according to claim 1, wherein:

the display is disposed at an upper position on a front window shield in the vehicle with a display surface oriented toward a back of the vehicle; and as the display image, the display control unit displays, on the display, an image created by reversing a left and right of the image obtained by photography with the camera and then inclining the reversed image through an angle that has the same absolute value as the inclination angle detected by the inclination angle detecting unit in a direction opposite to a direction of an inclination of the inclination angle.

3. The electronic mirror system according to claim 2, wherein the display control unit inclines a predetermined display object through an angle that has the same absolute value as the inclination angle detected by the inclination angle detecting unit in a direction opposite to a direction of an inclination of the inclination angle, combines the inclined predetermined display object with the display image, and displays the combined image on the display.

4. The electronic mirror system according to claim 3, wherein the display object is an icon or an image that represents a state at a back in the vehicle when viewed from a front in the vehicle.

5. The electronic mirror system according to claim 4, further comprising a display unit that includes the display and a half mirror disposed in front of a display surface of the display, wherein:

an electronic mirror mode and a mirror mode are available in the electronic mirror system;

when the electronic mirror mode is in progress, the display control unit displays the display image on the display; and when the mirror mode is in progress, the display control unit performs control to lower brightness of the display surface of the display so that the half mirror functions as a mirror.

6. The electronic mirror system according to claim 4, further comprising:

a display unit that includes the display and a half mirror disposed in front of a display surface of the display; and an inclination sensor that measures inclination angles of the display unit around three mutually orthogonal axes of the display unit; wherein the inclination angle detecting unit detects the inclination angle of the horizontal coordinate axis with respect to the horizontal direction of the vehicle, measured by the inclination sensor, of the display unit, and when the inclination angles measured by the inclination sensor indicate that the display surface of the display of the display unit is oriented to the head of a passenger in the vehicle, the display control unit performs control to lower brightness of a whole or part of the display surface of the display so that a whole or part of the half mirror functions as a mirror.

7. The electronic mirror system according to claim 3, further comprising a display unit that includes the display and a half mirror disposed in front of a display surface of the display, wherein:

an electronic mirror mode and a mirror mode are available in the electronic mirror system;

when the electronic mirror mode is in progress, the display control unit displays the display image on the display; and when the mirror mode is in progress, the display control unit performs control to lower brightness of the display surface of the display so that the half mirror functions as a mirror.

8. The electronic mirror system according to claim 3, further comprising:

a display unit that includes the display and a half mirror disposed in front of a display surface of the display; and an inclination sensor that measures inclination angles of the display unit around three mutually orthogonal axes of the display unit; wherein the inclination angle detecting unit detects the inclination angle of the horizontal coordinate axis with respect to the horizontal direction of the vehicle, measured by the inclination sensor, of the display unit, and when the inclination angles measured by the inclination sensor indicate that the display surface of the display of the display unit is oriented to the head of a passenger in the vehicle, the display control unit performs control to lower brightness of a whole or part of the display surface of the display so that a whole or part of the half mirror functions as a mirror.

9. The electronic mirror system according to claim 2, further comprising a display unit that includes the display and a half mirror disposed in front of a display surface of the display, wherein:

an electronic mirror mode and a mirror mode are available in the electronic mirror system;

when the electronic mirror mode is in progress, the display control unit displays the display image on the display; and when the mirror mode is in progress, the display control unit performs control to lower brightness of the display surface of the display so that the half mirror functions as a mirror.

10. The electronic mirror system according to claim 2, further comprising:

a display unit that includes the display and a half mirror disposed in front of a display surface of the display; and an inclination sensor that measures inclination angles of the display unit around three mutually orthogonal axes of the display unit; wherein the inclination angle detecting unit detects the inclination angle of the horizontal coordinate axis with respect to the horizontal direction of the vehicle, measured by the inclination sensor, of the display unit, and when the inclination angles measured by the inclination sensor indicate that the display surface of the display of the display unit is oriented to the head of a passenger in the vehicle, the display control unit performs control to lower brightness of a whole or part of the display surface of the display so that a whole or part of the half mirror functions as a mirror.

11. The electronic mirror system according to claim 1, wherein the display control unit inclines a predetermined display object through an angle that has the same absolute value as the inclination angle detected by the inclination angle detecting unit in a direction opposite to a direction of an inclination of the inclination angle, combines the inclined predetermined display object with the display image, and displays the combined image on the display.

12. The electronic mirror system according to claim 11, wherein the display object is an icon or an image that represents a state at a back in the vehicle when viewed from a front in the vehicle.

13. The electronic mirror system according to claim 12, further comprising a display unit that includes the display and a half mirror disposed in front of a display surface of the display, wherein:

an electronic mirror mode and a mirror mode are available in the electronic mirror system;

when the electronic mirror mode is in progress, the display control unit displays the display image on the display; and when the mirror mode is in progress, the display control unit performs control to lower brightness of the display surface of the display so that the half mirror functions as a mirror.

14. The electronic mirror system according to claim 12, further comprising:

a display unit that includes the display and a half mirror disposed in front of a display surface of the display; and an inclination sensor that measures inclination angles of the display unit around three mutually orthogonal axes of the display unit; wherein the inclination angle detecting unit detects the inclination angle of the horizontal coordinate axis with respect to the horizontal direction of the vehicle, measured by the inclination sensor, of the display unit, and when the inclination angles measured by the inclination sensor indicate that the display surface of the display of the display unit is oriented to the head of a passenger in the vehicle, the display control unit performs control to lower brightness of a whole or part of the display surface of the display so that a whole or part of the half mirror functions as a mirror.

15. The electronic mirror system according to claim 1, further comprising a display unit that includes the display and a half mirror disposed in front of a display surface of the display, wherein:

an electronic mirror mode and a mirror mode are available in the electronic mirror system;

when the electronic mirror mode is in progress, the display control unit displays the display image on the display; and when the mirror mode is in progress, the display control unit performs control to lower brightness of the display surface of the display so that the half mirror functions as a mirror.

16. The electronic mirror system according to claim 1, further comprising:

a display unit that includes the display and a half mirror disposed in front of a display surface of the display; and an inclination sensor that measures inclination angles of the display unit around three mutually orthogonal axes of the display unit; wherein the inclination angle detecting unit detects the inclination angle of the horizontal coordinate axis with respect to the horizontal direction of the vehicle, measured by the inclination sensor, of the display unit, and when the inclination angles measured by the inclination sensor indicate that the display surface of the display of the display unit is oriented to the head of a passenger in the vehicle, the display control unit performs control to lower brightness of a whole or part of the display surface of the display so that a whole or part of the half mirror functions as a mirror.

\* \* \* \* \*